Nov. 24, 1931. G. KRAENZLEIN ET AL 1,833,291
HEAT EXCHANGE DEVICE
Filed March 27, 1929 2 Sheets-Sheet 2
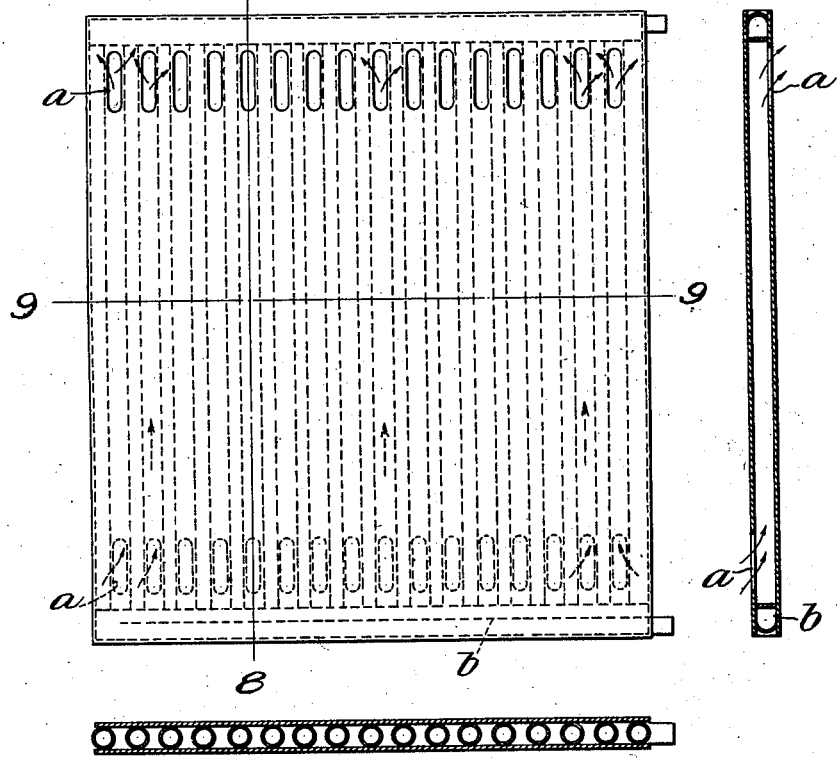

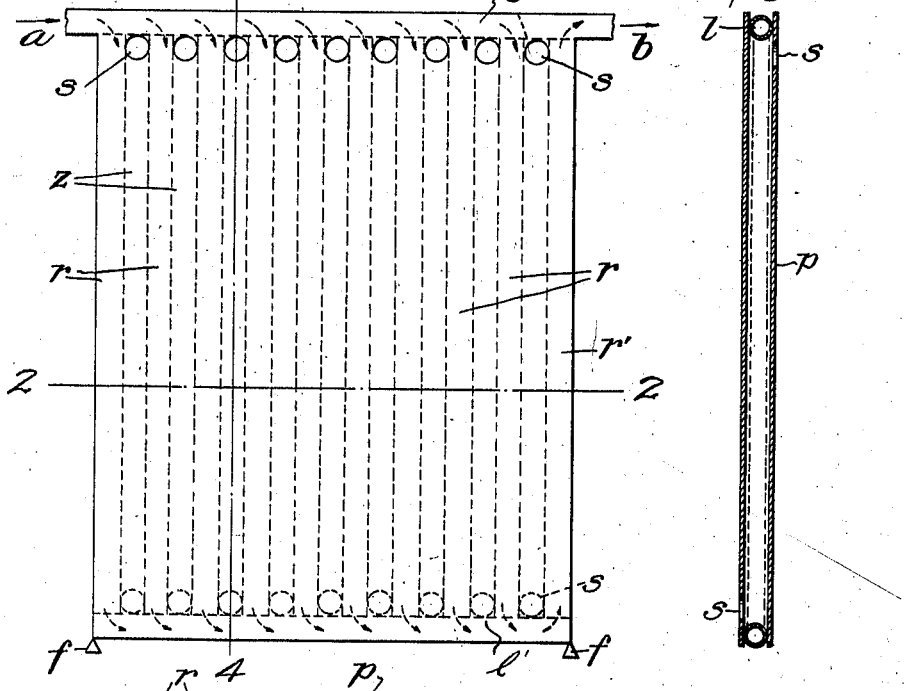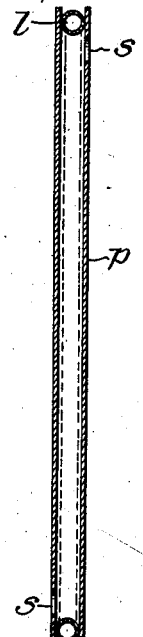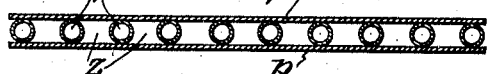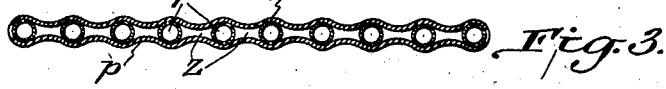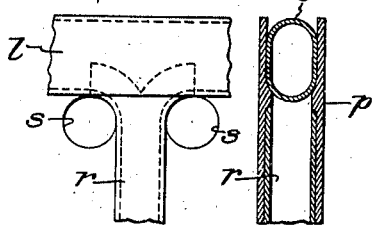

Patented Nov. 24, 1931

1,833,291

UNITED STATES PATENT OFFICE

GEORG KRAENZLEIN, OF FRANKFORT-ON-THE-MAIN-HOCHST, AND RICHARD SAMESREUTHER, OF BUTZBACH IN HESSEN, GERMANY

HEAT EXCHANGE DEVICE

Application filed March 27, 1929, Serial No. 350,351, and in Germany April 10, 1928.

It is the object of this invention to provide a heat-exchange device which shall possess great heating power and at the same time require very little space for its installation.

With this object and such others as may be made apparent hereinafter, we have invented a heat-exchange device which consists of pipes placed, at suitable distances apart, between straight or curved plates which are in parallel, with which plates the pipes are in contact, such as by welding or soldering, or otherwise in such a manner that they are adapted to transmit heat or cold and that a heating or cooling fluid can be conducted through them.

The pipes can be fastened to the plates, for instance, by soldering or welding them either to both or one of the plates for which purpose the plate is provided with slots through which the tubes are soldered or welded from that side which is opposite to the pipes and the slots are then filled up with some soldering or welding material. Furthermore the system of tubes may be inserted into two flanged plates, intimately united by grooves or folds, and if required, subsequently welded on.

There are shown in the accompanying drawings embodiments of the invention by way of illustration, to which embodiments, however, the invention is not limited.

Fig. 1 is a part elevation of a heat-exchange device.

Fig. 2 is a section on line 2—2 of Fig. 1.

Fig. 3 is a section similar to Fig. 2 showing a modification.

Fig. 4 is a section on line 4—4 of Fig. 1.

Fig. 5 shows in elevation and Fig. 5ª in vertical section a part of a modification drawn to an enlarged scale.

Fig. 6ª shows in elevation and Fig. 6 in horizontal section drawn to an enlarged scale a part of the device shown in Fig. 1 to illustrate how the pipes are fixed to a plate.

Fig. 7 is a part elevation of a somewhat modified heat-exchange device.

Fig. 8 is a section on line 8—8 of Fig. 7.

Fig. 9 is a section on line 9—9 of Fig. 7.

Referring to the drawings the pipes $r$ are placed between the plates $p$ which are slotted as at $m$ (Fig. 6) and solder is applied at these slots to fix the pipes to the plates.

The pipes are connected in top and bottom headers $l$ and $l'$ respectively.

In the form shown in Figs. 1 and 2 the plates $p$ are flat; Fig. 3 illustrates a form in which the plates $p$ are corrugated.

For a purpose presently to be described the plates $p$ have openings $s$ situated so as to register with the spaces between the pipes $r$. In Figs. 1 and 2 one plate has such openings at its upper part and the other at its lower part. Equally well, for some purposes, the openings may all be in one plate, at the top part and at the bottom part thereof.

In the modification shown in Fig. 5 the pipes $p$ are split and splayed at their ends and these ends are welded to openings in the pipe $l$ which plays the part of the header $l$ in Fig. 1.

The operation of the device is as follows:
Steam or hot water enters at $a$ (Fig. 1) and streams continuously and uniformly from the upper header $l$ through the vertical pipes $r$ to the lower header $l'$. The uniform distribution of heat, for instance, is facilitated if the entrance to each vertical pipe $r$ is larger than that to the preceding pipe in the direction $a$—$b$. The header $l$ is closed by a plate $st$, so that the heating agent is conducted from the lower header $l'$ only through pipe $r'$.

If the heating is to be produced by steam, the plate $st$ in Fig. 1 is advantageously dispensed with so that the steam passes through all the pipes $r$, $r'$ in downward direction, it being necessary, of course, that the exhaust connecting branch $b$ be fitted to the lower end of the pipe $r'$. In Figs. 7 and 8 a plate $b$ is provided in the lower header $l'$ for uniform heat distribution by heating with steam or warm water.

Fig. 1 shows an apparatus of a special construction in which the spaces between the parallel pipes $r$ are in communication with the open air through the aforesaid openings $s$. This mode of construction has the additional advantage that a large current of air produced by convection in the said spaces is caused to flow rapidly through the device, and consequently—in particular when apartments are to be heated—a very rapid heating of the entire air in the room is effected. The air is preheated in the lower part of the device and leaves the apparatus where the temperature is highest, so that the heat is utilized to a maximum. If this novel heating device is to be installed at or in the wall separating two rooms, it is advantageous that upper and lower openings s should be on each side of the device so that uniform and constant exchange of heat from one room into the other is assured.

Another advantage of the novel heating devices over those hitherto used is the easy and simple way in which they can be cleaned by passing a vacuum-cleaner along the upper ventilation slots which open into the room to be heated.

The advantages of the above described apparatus and of the different modes of constructing it constitute an important progress in the art of heating and cooling, especially because the new apparatus constitutes a perfectly plain heating aggregate occupying only a very small space for its installation and therefore, when being mounted in window recess does not diminish—as is the case with the hitherto used radiators—the thickness of the outer wall of the room. The extremely small space occupied by the heating bodies, their small dimensions and their plain and yet elegant outlines make them particularly suitable for use in houses of modern style. This does not only involve a great progress from the aesthetic point of view but the fact that they can be installed in the walls without projecting therefrom makes it possible to dispense with the usual expensive wood—or metal wainscoting, which involves a further great economy.

We claim:

1. Heat-exchange device comprising two parallel plates, parallel, spaced pipes between the said plates and in contact with both, the plates being provided with openings which register with the spaces between the pipes, the ends of said spaced pipes being connected with upper and lower headers, the lower header being provided with a plate in order to equalize the distribution of the heating agent.

2. Heat-exchange device comprising two parallel plates, parallel, spaced pipes arranged between the said plates and in intimate contact with these plates, the spaces between the pipes being filled with air, the ends of said spaced pipes being connected with upper and lower headers, the lower header being provided with a plate in order to equalize the distribution of the heating agent.

3. Heat-exchange device comprising two parallel plates, parallel spaced pipes arranged between the said plates and in intimate contact with these plates, the spaces between the pipes being filled with air, the plates being provided with openings which register with the spaces between the pipes to provide for circulation of air therethrough, the ends of said spaced pipes being connected with upper and lower headers.

In testimony whereof, we affix our signatures.

GEORG KRAENZLEIN.
RICHARD SAMESREUTHER.